(12) United States Patent
Xiao et al.

(10) Patent No.: US 8,037,157 B2
(45) Date of Patent: Oct. 11, 2011

(54) APPARATUS AND METHOD FOR GENERATING AND USING A CUSTOMIZED UNIFORM RESOURCE LOCATOR

(75) Inventors: Wen Peng Xiao, Beijing (CN); Yang Min, Beijing (CN); Rong Yao Fu, Beijing (CN); Chang Yan Chi, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 182 days.

(21) Appl. No.: 12/363,019

(22) Filed: Jan. 30, 2009

(65) Prior Publication Data
US 2009/0210807 A1  Aug. 20, 2009

(30) Foreign Application Priority Data
Jan. 30, 2008  (CN) .......................... 2008 1 0008872

(51) Int. Cl.
*G06F 15/16* (2006.01)
(52) U.S. Cl. ...................................................... 709/218
(58) Field of Classification Search .................... 709/218
See application file for complete search history.

(56) References Cited

U.S. PATENT DOCUMENTS

| | | | | |
|---|---|---|---|---|
| 6,012,087 | A * | 1/2000 | Freivald et al. | 709/218 |
| 7,321,917 | B2 * | 1/2008 | Durham | 709/203 |
| 7,783,249 | B2 * | 8/2010 | Robinson | 455/3.06 |
| 2002/0010798 | A1 * | 1/2002 | Ben-Shaul et al. | 709/247 |
| 2002/0073058 | A1 * | 6/2002 | Kremer et al. | 707/1 |
| 2002/0194081 | A1 * | 12/2002 | Perkowski | 705/26 |
| 2005/0188051 | A1 * | 8/2005 | Sneh | 709/213 |
| 2007/0106650 | A1 | 5/2007 | Moore | |
| 2007/0130518 | A1 * | 6/2007 | Shavit et al. | 715/530 |
| 2007/0136320 | A1 * | 6/2007 | Sah et al. | 707/100 |

FOREIGN PATENT DOCUMENTS

| | | |
|---|---|---|
| WO | WO 2007/063549 | 6/2007 |
| WO | WO 2007/070405 | 6/2007 |

OTHER PUBLICATIONS

Ben Smith, Anurag Acharya, Tao Yang, and Huican Zhu. 1999. Exploiting result equivalence in caching dynamic web content. In Proceedings of the 2nd conference on USENIX Symposium on Internet Technologies and Systems—vol. 2 (USITS'99), vol. 2. USENIX Association, Berkeley, CA, USA, 19-19.*
Ort, Ed, et al., "Mashup Styles, Part 1: Server-Side Mashups", http://java.sun.com/developer/technicalArticles/J2EE/mashup_1/index.html; May 1, 2007.

* cited by examiner

*Primary Examiner* — Ajay Bhatia
(74) *Attorney, Agent, or Firm* — Stephen Bongini; Fleit Gibbons Gutman Bongini & Bianco PL

(57) ABSTRACT

An apparatus is provided for generating a Customized Uniform Resource Locator (CURL). The apparatus includes a request receiver, an information obtainer, and a CURL register. The request receiver is adapted to receive a request for assigning a CURL applied by a user to selected content in a network resource accessed through a normal URL. The information obtainer is adapted to obtain the normal URL, the CURL, and a set of description information of the selected content. The CURL register is adapted to obtain a browser context, an application context, and a system context related to the selected content, and is further adapted to store the browser context, the application context, and the system context which have been obtained with the normal URL, the CURL, and the set of description information of the selected content into a CURL repository as a whole.

19 Claims, 7 Drawing Sheets

*http://finance.ibm.com/stock/company/sh60008/nc.shtml*

*http://finance.ibm.com/stock/company/sh60008/nc.shtml/20070615_1342* http://store.ibm.com/cart.shtml http://store.ibm.com/cart.shtml/gary_java

*http://mail.ibm.com/webmail*

*http://mail.ibm.com/webmail/xiaowp@cn.ibm.com/contacts/chicy* http://trip.ibm.com/xian
http://trip.ibm.com/xian/intro http://video.ibm.com/xian
http://video.ibm.com/xian/1:30-2:30

APPARATUS AND METHOD FOR GENERATING AND USING A CUSTOMIZED UNIFORM RESOURCE LOCATOR

CROSS REFERENCE TO RELATED APPLICATIONS

This application is based upon and claims priority from prior Chinese Patent Application No. 200810008872.7, filed Jan. 30, 2008, the entire disclosure of which is herein incorporated by reference.

FIELD OF THE INVENTION

The present invention generally relates to generating a Customized Uniform Resource Locator (CURL) and accessing network resource using the generated CURL, and more particularly to assigning a CURL to a user's interested Internet resource and directly accessing the Internet resource again using the CURL when necessary.

BACKGROUND OF THE INVENTION

A Uniform Resource Locator (URL) is used to define the route to a specified resource in Internet server. In current art, any resource that can be accessed on the Internet is assigned a unique URL, and client software such as an HTML browser can access a corresponding resource using the URL. However, current URLs cannot satisfy the requirement of users very well in terms of reproduction of dynamic network resource and granularity access. In particular, more and more network resources are generated in a dynamic manner by a server. This results in the content being displayed differently when accessed by different users through the same URL, or when accessed by the same user through the same URL in different scenarios (such as different time). That is, the resource generated dynamically cannot be reproduced, thus inconveniencing the users.

For example, FIG. 1 shows an HTML page of stock price statistic, in which a graph is used to represent the price variations of stock exchange. It is easy to see that the graph must be varied as time varies. For instance, the graph viewed by user A through finance.ibm.com/stock/company/sh60008/nc.shtml in the first day is different from the graph viewed through the same URL in the second day. That is, user A cannot view the graph of the first day through the above URL on the second day and afterwards. Therefore, if user A wishes to be able to refer to the stock trend for previous instances of tie, the user can only save the daily graphs and related pages manually. This not only occupies large amounts of storage space in the client, but also is quite troublesome. Moreover, since user A saves the graphs and related pages in his local machine, other users in the network cannot obtain these resources by accessing the network server. If user A wishes to share these resources with other users in the network, the user has to distribute the saved graph resource to each of the other users, which is obviously troublesome and time-consuming.

In another aspect, when a URL is used it is often regarded as a file, that is, the user cannot specify the URL for any lower granularity of a resource, e.g., a function in the web application or a fragment of HTML document. With the appearance and development of Web 2.0, the need for simply integrating parts of the functions of different web applications together is more and more proposed. A typical scenario is that, when a user sees a calendar widget in a website, the user would like to mash it up into his/her personal blog site, instead of developing this calendar widget himself/herself. Under this trend, people have begun to consider using REST architecture to specify a URL for a specified resource (e.g., specifying URL for respective functions of the web applications) by providing RESTful API, and integrating the fragments of different resources together using mash-up technique. However, for most current conventional applications, RESTful API is not provided to realize mash-up, thus a lot of coding work still has to be done when performing functional integration among different web applications.

SUMMARY OF THE INVENTION

The various embodiments of the present invention include an apparatus and a method for generating a Customized Uniform Resource Locator (CURL). The various embodiments of the present invention also include an apparatus and a method for providing network resources corresponding to CURL in response to access request from users. A client user can assign a CURL for his/her interested Internet resource, e.g. a part of functions in web applications such as a certain fragment of HTML document, or web page contents under a certain scenario, and can access the interested network resource directly by entering the CURL in a browser when necessary According to one embodiment of the present invention, an apparatus for generating CURL is disclosed. The apparatus includes a request receiving mechanism which receives a request for assigning a CURL applied by a user for selected content in a network resource accessed through a normal URL. An information obtaining mechanism obtains the normal URL, the applied CURL and description information of the selected content. A CURL registering mechanism obtains browser context, application context and system context in association with the selected content, and stores the obtained context with the normal URL, the applied CURL, and the description information of the selected content into a CURL repository as a whole.

According to another embodiment of the present invention, a method for generating Customized Uniform Resource Locator (CURL) is disclosed. The method includes receiving a request for assigning a CURL applied by a user to selected content in a network resource accessed through a normal URL. The normal URL, the applied CURL, and description information of the selected content are obtained. Browser context, application context and system context related to the selected content are also obtained. The obtained context is stored with the normal URL, the applied CURL and the description information of the selected content into a CURL repository as a whole.

According to another embodiment of the present invention, an apparatus for providing network resources corresponding to Customized Uniform Resource Locator (CURL) in response to an access request from a user is disclosed. The apparatus includes an access request processing mechanism. The access request processing mechanism, in response to a CURL access address from a user, fetches context, description information of selected content and original normal URL corresponding to the CURL access address from a CURL repository, and transmits them to context restorer and content reproducer. A context restorer restores browser context, application context and system context according to contexts received from the access request processing mechanism. The context restorer then transmits these items to the content reproducer. A content reproducer reconstructs network resources requested for access in the restored context condition according to the normal URL and the description information of the selected content received from the access request processing means and transmits it to client browser.

According to yet another embodiment of the present invention, a method for providing network resources corresponding to Customized Uniform Resource Locator (CURL) in response to an access request from a user is disclosed. The method includes accepting a CURL access address from the user, fetching context information, description information of selected content and original normal URL corresponding to the CURL from a CURL repository. Browser context, application context and system context are restored using the fetched context information. The requested network resource is reconstructed in the restored context condition and transmitted to client.

Generating a CURL and providing network resources corresponding to CURL when a user requests for access of the present invention allows resources on the Internet to be accessed in lower granularity. Therefore, a portion of HTML document can be shared with others in cooperation condition and network functions can be integrated fast and easily by simply citing CURL. In addition, the various embodiments of the present invention can bind a resource generated dynamically into a CURL, so that this resource can be reproduced in the future.

BRIEF DESCRIPTION OF THE DRAWINGS

These and other aspects, features, and advantages of the various embodiments of the present invention will become more apparent and easier to understand from the following description of embodiments in conjunction with the figures in which.

DETAILED DESCRIPTION

Figure 1:
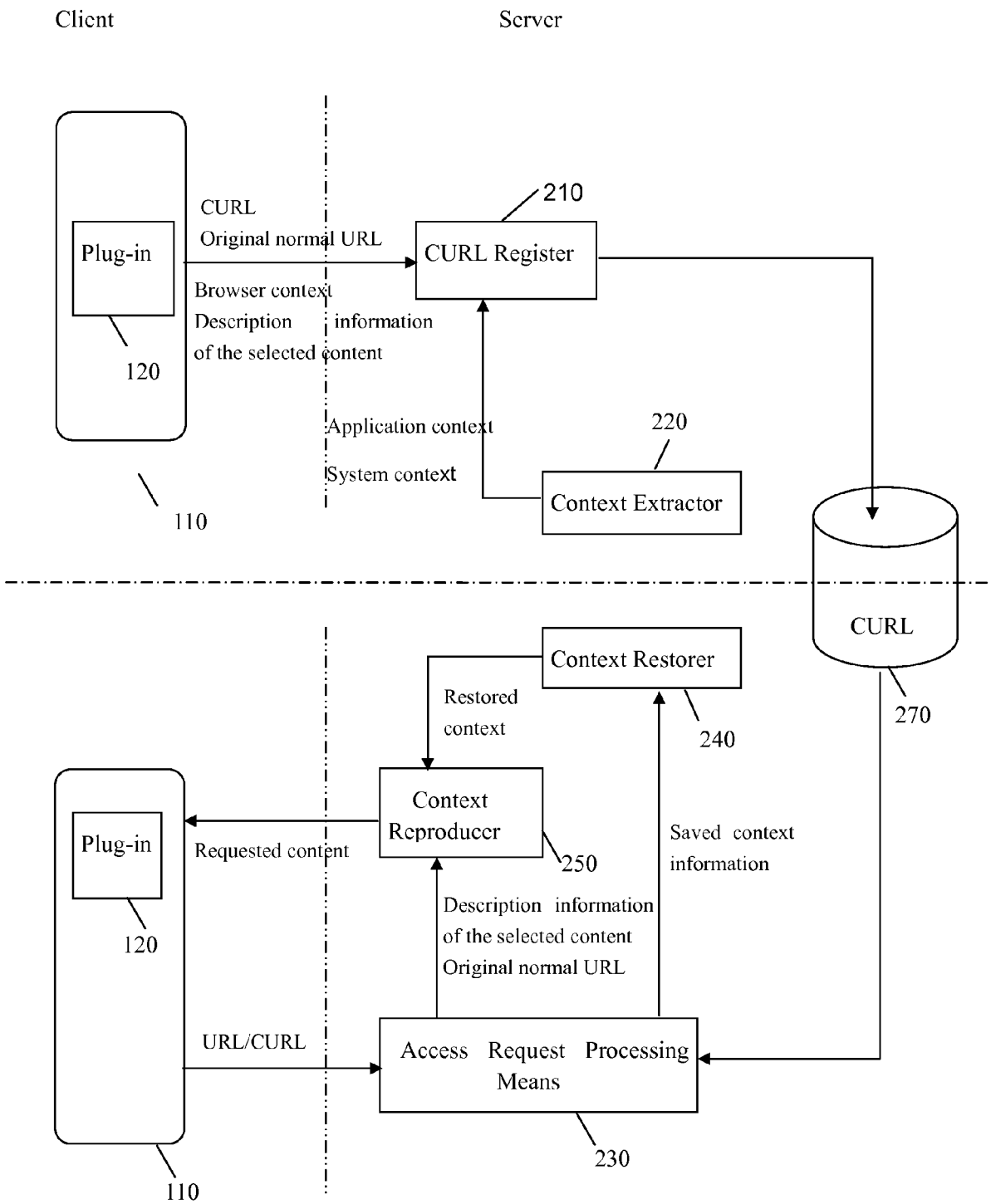
FIG. 1 shows an overall view of a generating system for generating a CURL and a providing system for providing a user with the requested network resource when the user accesses network resource using the generated CURL according to one embodiment of the present invention.

Reference will now be made in detail to various embodiments of the present invention, examples of which are illustrated in the accompanying drawings, wherein like reference numerals refer to like elements throughout. The various embodiments of the present invention may, however, be embodied in many different forms and should not be construed as being limited to the embodiments set forth herein; rather, these embodiments are provided so that this disclosure is thorough and complete, and will fully convey the concept of the various embodiments of the present invention to those skilled in the art. Hereinafter, the exemplary embodiments are discussed with reference to the accompanying drawings to explain the various embodiments of the present invention.

FIG. 1 shows an overall view of a generating system for generating a CURL and a providing system for providing a user with the requested network resource when the user accesses a network resource using the generated CURL according to one embodiment of the present invention. In particular, the upper part (above the horizontal dashed line) of FIG. 1 shows the generating system for generating a CURL according to one embodiment of the present invention. Client user can assign a customized URL (which will simply be called "CURL" thereafter) to his/her interested Internet resource, e.g. a certain fragment of a HTML document, or web page contents at a certain time in the system. The lower part (below the horizontal dashed line) of FIG. 1 shows the providing system for providing a user with the requested network resource when the user accesses the network resource using the generated CURL. According to the system, any user can access the interested network resource by entering the generated CURL in a browser directly.

Firstly, the structure of the above generating system is discussed in detail. As shown in FIG. 1, the system has client/server architecture. The client includes a browser, which receives a CURL assigning request from users and requests the server for assigning the CURL. The server assigns the CURL in response to the request from the users. In particular, the client browser 110 includes a plug-in 120. When a user accesses a network resource through a normal URL via a browser, he/she may activate the plug-in to select his/her interested content in the network resource and apply a CURL for the content. For instance, if the user is interested in HTML web page content at a certain time, he/she may apply a CURL for the web page at this time using the plug-in 120; if the user is interested in one or more fragments of the HTML page, he/she may box-select the fragment(s) in the HTML page using the plug-in 120, and apply a CURL for the fragment(s). When the user selects his/her interested content and enters a CURL which he/she wishes to assign to the content, the plug-in 120 generates description information of selected content, which can be used to determine the selected content, and transmits the description information with the original normal URL and the applied CURL to the server to request the server for assigning the applied CURL. When the server accepts the assigning request from the user, the plug-in 120 also extracts the browser context and transmits it to the server according to the instruction from the server.

The browser context mentioned in the specification refers to some information saved in the user's computer through a browser by a certain website when the user accesses the website, such as Cookie and current values of corresponding variables in JavaScript. The plug-in 120 can extract the browser context according to a predetermined rule. For instance, for the browser context corresponding to the normal URL, the browser context that is to be extracted from the browser when the user applies a CURL with respect to the application or some functions of the application can be specified explicitly in a configuration file. Alternatively the browser context that is to be extracted is not specified explicitly, while all the browser context information related to the application such as all the Cookies and variables in JavaScript is to be extracted by default.

The plug-in 120 can be realized in a variety of forms. In one example, the plug-in 120 can be realized by programming the browser by an extended interface provided by the browser, such as an extension mechanism provided by Firefox, or ActiveX mechanism supported by Internet Explorer. In another example, this plug-in can be provided by the server, so that the user can download this plug-in and embed it into the browser when accessing network resources via the server. As a part of browser 110, the plug-in can obtain the Cookie values saved on a hard disk by the browser and can also obtain the required JavaScript object values dynamically through Document Object Model (DOM) of the browser transmit them to the server when necessary. Communications between the browser plug-in and the server can be realized through HTTP protocols. According to the explanations above, those skilled in the art can easily realize the browser plug-in 120, therefore the detailed description of its specific realization is not be given in the specification.

The description information of the selected content mentioned in the specification is the description information that can be used to determine the interested content selected by the user. For instance, the description information may include a sign bit for identifying whether the content selected by the user is a complete resource accessed through a normal URL (such as a complete HTML page) or one or more fragments of the resource (such as one or more page fragments). In particular, the description information may include path information of corresponding content on Document Object Model in the current browser. For example, /html/body/tr/td can be used to represent the fragment content selected by the user for the following document:

```
<html>
  <body>
    <table>
      <tr>
        <td>Text</td>
      </tr>
    </table>
  </body>
</html>
```

In practice, there are more complicated mechanisms to represent the path, but in all these mechanisms one or more areas, i.e., page fragments, selected by the user currently can be determined by using a starting path and an ending path. It is should be noted that the above mentioned mechanism is just one example of the description information of the selected content, and obviously the description information of the selected content can also utilize various other representation mechanisms, such as regular expression, to match the selected content.

In another example, the structure discussed above is only an example of a structure of the client, and other different structures can also be utilized. For example, although the functions and operations of the client are discussed above as being realized by a single plug-in 120 in the browser, the functions and operations can also be realized by a plurality of modules jointly. In particular, the client browser may include a content selecting module for box-selecting the user's interested content; description information of a selected content generating module for generating the description information of the selected content by which the content selected by the user can be determined; a CURL applying module for receiving a CURL applied by the user; a context extracting module for extracting the browser context; a context selecting module for determining by the user the context he wants to save upon generating the CURL; and a CURL transmitting module for transmitting the original normal URL, the CURL entered by the user, the description information of the selected content and the client context to the server.

Referring to FIG. 1 again, as shown in the figure, the server includes a CURL register 210 for processing the CURL assigning request from the client, a context extractor 220 for extracting the application context and the system context, a CURL repository 270 for storing the original normal URL, the applied CURL, the browser context and the description information of the selected content from the client, as well as the obtained application context and system context. Hereinafter, detailed descriptions are given to these elements.

The CURL register 210 receives the CURL assigning request from the client, obtains the related normal URL, the applied CURL and the description information of the selected content, and determines whether the applied CURL has been used, i.e., whether the applied CURL is repetitive with the existing CURLs saved in the CURL repository. When it is determined that this CURL has not been used, the CURL register 210 accepts this request, instructs the browser plug-in 120 and the context extractor 220 to extract the browser context, the application context, and the system context respectively, and saves them with the obtained corresponding normal URL, the applied CURL, and the description information of the selected content into the CURL repository 270 as a whole. And when the CURL register determines that the applied CURL is not acceptable, rejection information is returned to the client.

It is should be noted that although the CURL register 210 is discussed above as determining whether the CURL is acceptable according to whether the applied CURL has been used, in fact, any determination principle can be set according to specific requirements to make the determination. For example, it can be set that only users who have related authorities to the original normal URL can apply a CURL based on the original URL. Then the CURL register 210 determines whether the CURL is applied by people with authority in the first place upon receiving the applied CURL. The CURL register 210 then determines whether the CURL has been used. Alternatively, the server can set a naming rule, so that only CURL in accordance with the naming rule can be accepted.

The application context mentioned in the specification refers to Session information related to the current user in the server, which is related to a specific application. Once a user accesses an application running on a HTTP server, a Session related to the user is formed in the server. The Session can be uniquely identified by the browser being currently used by the user, and once the user quits the browser, the related Session becomes invalid. In particular, the user can also submit the request for invalidating the current Session to the server explicitly. The server can also set the time of Session invalidation, and if no request for accessing the application is received from any user within prescribed time, the corresponding Session becomes invalid automatically. Within valid period of the Session, all the information when the current user accesses the corresponding application is reserved in the Session, and this information is generally reserved in a manner of keyword/value pairs, such as USER_NAME="GARY".

The system context mentioned in the specification refers to the system environment condition when the operating system or the current HTTP server is running, such as system time or IP address. This information is also typically reserved in the manner of keyword/value pairs, such as SYSTEM_TIME="2007-10-10 11:32:26".

The context extractor 220 is used to extract the application context and system context according to the instruction of the CURL register based on the predetermined rules. For instance, for the application context and system context corresponding to the normal URL, the context information that is to be extracted from the application, i.e., some specific keyword/value pairs in the Session and the context information that is to be extracted from the system when the user applies a CURL with respect to the application or some functions of the application, can be specified explicitly in a configuration file. Alternatively, the application context and system context that is to be extracted are not specified explicitly, while all the application context information, i.e., all the keyword/value pairs in the Session and the system context information related to the application is to be extracted by default. The context extractor 220 can be realized as an extension of the current HTTP server, and currently all the general HTTP servers provide the corresponding extension mechanism, such as Microsoft IIS and Apache, etc.

In another example, the above discussed is only an exemplary structure of the server, and obviously the server according to the various embodiments of the preset invention can utilize other different structures. For instance, although the CURL register 210 is discussed above as a single means, the functions and operations thereof can also be realized by a plurality of means jointly. For example, the register 210 may include a request receiving means for receiving the CURL assigning request from the client; an information obtaining means for obtaining the related normal URL, the applied CURL, and the description information of the selected content from the assigning request. The register 210 can also include mechanisms for determining whether the applied CURL is acceptable, and then notifying the CURL registering means of the determination result. The register 210 can also include a CURL registering means for obtaining the browser context, the application context, and system context and storing them with the obtained corresponding normal URL, the applied CURL, and the description information of the selected content into the CURL repository 270 as a whole. In addition, although the CURL repository 270 is discussed above as an internal means of the server, it should be noted the CURL repository can be implemented as an external memory, i.e., the server does not include the CURL storage means, and the CURL and the related information are stored to external memory.

As discussed above, when the CURL is created, any user in the network may request the corresponding content in the server by entering the CURL address in the client browser using the providing system as shown in the lower part of FIG. 1. As shown in FIG. 1, the providing system has client/server architecture. The client includes a browser, which transmits a CURL access request entered by the user to the server when receiving the access request, and returns the network resource corresponding to the entered CURL. Since the browser has similar structures with the browser in the above discussed generating system, the detailed description of the browser is omitted herein.

When the user enters the CURL access address via the client browser to request for accessing corresponding network resource, the server reconstructs the network resource corresponding to the entered CURL in response to the access request and outputs the network resource to the client. Referring to FIG. 1, the server includes an access request processing means 230 for fetching the context, the description information of the selected content, and the original normal URL corresponding to the CURL from the CURL repository in response to the CURL access address from the user. The access request processing means 230 transmits these items to a context restorer and content reproducer. The context restorer 240 restores the browser context, the application context, and the system context. The content reproducer 250 reconstructs the requested content in the restored context condition based on the original normal URL and the description information of the selected content and transmits the content to the client. A CURL repository 270 stores the original normal URL, the applied URL, and the description information of the selected content, the browser context, the application context, and the system context. Hereinafter, detailed description is given to these elements.

When the access request processing means 230 receives the CURL access address from the user, it obtains the original normal URL, context information, and the description information of the selected content corresponding to the CURL from the CURL repository, transmits the context information to the context restorer 240, and transmits the original normal URL and the description information of the selected content to the content reproducer 250. It should be noted that since the user can not only enter the CURL access address in the client browser, but also enter the normal URL address to request for accessing a normal network resource, a CURL filter (not shown) can be provided before the access request processing means 230 discussed above. When receiving an address entered by the user, the CURL filter compares the address with the CURLs saved in the CURL repository, to determine whether a user is requesting a normal URL or a CURL. When it is determined that user has entered a CURL, the CURL filter transmits the CURL to access request processing means 230. For the normal URL, the server processes the user's request in accordance with the normal HTTP server processing flow, and returns the corresponding HTTP response message, the specific implementation thereof is omitted herein.

The context restorer 240 restores the browser context, the system context, and the application context according to the received context information. The context restorer 240 then transmits these items to the content reproducer. Restoring the application context refers to construct a new server end code execution condition in the HTTP server according to the application context information reserved in a CURL library, and restores the corresponding Session information to the condition upon generating the CURL, i.e., filling the data structure representing user Session at the server end with the values saved in advance. Constructing the execution condition and maintaining the Session are functions that can be provided by all the current HTTP servers, and the context restorer 240 can implement the restoration of the application context by accessing these functions.

The system context is used only in the process of executing the code of the server end. For instance, for the system time in the system context, the system time corresponding to the time at which the CURL is generated is returned when restoring the system context. The context restorer 240 may implement the restoration of the system context by invoking the corresponding functions in the software package specifically used to save and restore the system context condition.

Restoring the browser context refers to setting the values of such as Cookie and the corresponding variables in JavaScript saved in user's computer as the values upon generating the CURL. When restoring the browser context, the context restorer 240 constructs a DOM tree in the server according to the output result to be returned to the client, and applies the saved browser context in the tree. DOM tree is a set of data structures saved in the memory upon implementation, and the restoration of the browser end context is modifying the current content on the corresponding data structure according to the saved context information. It should be noted that restoring the browser context using the DOM tree is only an example, and obviously the context restorer 240 can also utilize other manners to restore the browser context, such as saving and restoring all the status and variables in the browser directly.

The content reproducer 250 finds the server code (such as the corresponding Servlet for the application developed with Java and some PHP script for the application developed with PHP) corresponding to the received original normal URL. The content reproducer 250 then executes the found server code in the specific context condition restored by the context restorer 240, thereby reconstructing the corresponding complete network resource. Then, the content reproducer 250 determines whether the user want to access a complete network resource or a part of the network resource according to the received description information of the selected content. In other words, the content reproducer 250 determines whether the content selected by the user upon requesting for assigning CURL is a complete resource such as a complete HTML page or one or more fragments of the resource, i.e., one or more page fragments. If it is determined that the user wants to access a complete network resource, the content reproducer 250 transmits to the client browser the result obtained by executing the server code in the restored context condition. If it is determined that the user wants to access the fragments of the network resource, the content reproducer 250 obtains the corresponding fragments according to the description information of the selected content such as the starting path and the ending path, and transmits them to the client browser.

It should be noted that the above discussion is only one example of a structure of the server, and obviously the server according to the various embodiments of the present invention can also utilize other different structures. For instance, although the content reproducer 250 is discussed above as a single means, its function and operation can be also realized by a plurality of means jointly. For example, the C can include a complete resource reproducing means for executing the server code in the specific context condition restored by the context restorer 240 to reconstruct the corresponding complete network resource. The content reproducer 250 can also include a request resource providing means for determining whether the content selected by the user is a complete resource or fragments in the resource when requesting for assigning CURL according to the received description information of the selected content. When the complete network resource is selected, the complete network resource reconstructed by the complete resource reproducing means is transmitted to the client, and when the fragments in the network resource are selected, the corresponding fragments are obtained from the reconstructed complete network resource according to the description information of the selected content and transmitted to the client browser. Furthermore, although the CURL repository 270 is discussed as an internal means in the above description, it should be noted that obviously the CURL repository can be realized as an external memory, i.e., the CURL storage means is not included in the server, and the required information is obtained from the external memory.

Figure 2:
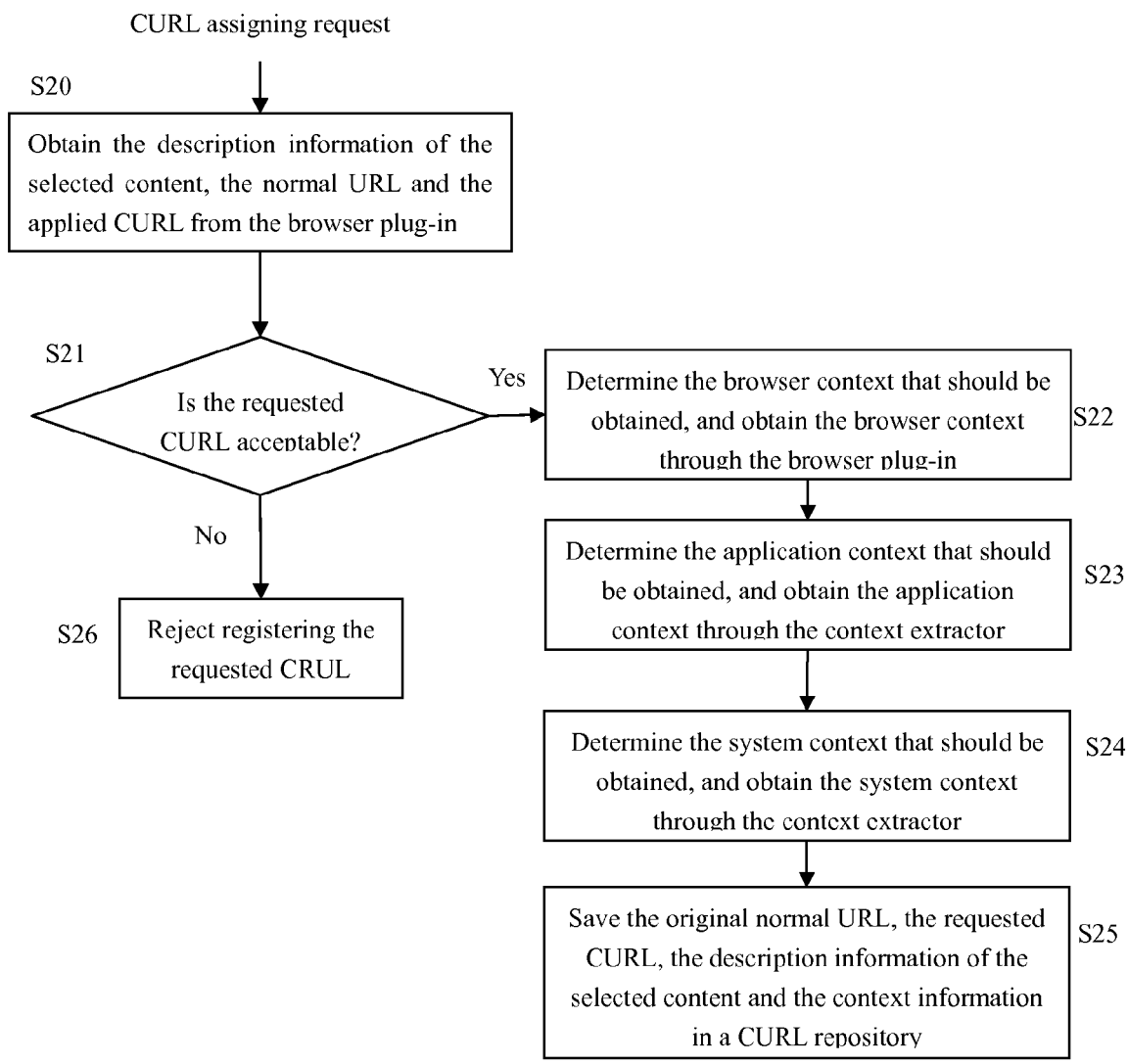
FIG. 2 shows a flowchart for generating a CURL in a server according to one embodiment of the present invention.

Description has been given to the CURL generating system and network resource providing system according to the embodiment of the present invention with reference to FIG. 1. The CURL generating and access method according to one embodiment of the present invention is discussed with reference to FIGS. 2 and 3. FIG. 2 shows a flowchart of generating CURL in a server according to an embodiment of the invention. As discussed above, when accessing a network resource through the normal URL via the browser, the user may activate the plug-in 120 in the browser to select the interested content in the network resource and apply a CURL for the content. The plug-in 120 generates the description information of the selected content for determining the selected content. The plug-in then transmits the description information together with the original normal URL and the applied CURL to the server to request the server for assigning the applied CURL. As discussed in FIG. 2, the CURL register 210 receives the CURL assigning request from the client and obtains the related description information of the selected content, the original normal URL and the applied CURL in step S20. Then, the CURL register 210 determines whether the applied CURL is acceptable according to the set determination rule in step S21.

When the CURL is acceptable the CURL register determines the browser context that is to be obtained and instructs the browser plug-in 120 of the client to extract the browser context in step S22. The application context that is to be obtained is determined and the context extractor 220 in the server is instructed to extract the application context in step S23. The system context that is to be obtained is determined and the context extractor 220 is instructed to extract the system context in step S24. As discussed above, the CURL register 210 may determine the context information that is to be obtained according to a plurality of predetermined rules, e.g., obtaining the context information according to a configuration file or obtaining all the context information related to the application by default. After the browser context the application context and the system context are obtained via the browser plug-in and the context extractor. The CURL register saves the context information with the received corresponding normal URL, the applied CURL and the description information of the selected content in a CURL repository 270 as a whole in step S25. If the CURL register 210 determines that the applied CURL is not acceptable in step S21, the rejection information is returned to the client, as shown in step S26.

With respect to one embodiment of generating a CURL, the CURL register does not save the context information extracted by the browser plug-in and the context extractor in the CURL repository 270 immediately after obtaining the context information, but displays the context information obtained currently to the client and prompts the user to select the context information that he wishes to save. The user may select the context information that his wishes to save using the browser plug-in according to his demands. The server saves only the context information selected by the user with the corresponding normal URL, the applied CURL and the description information of the selected content in response to the user's selection. Thus, user's demands can be satisfied more flexibly.

Figure 3:
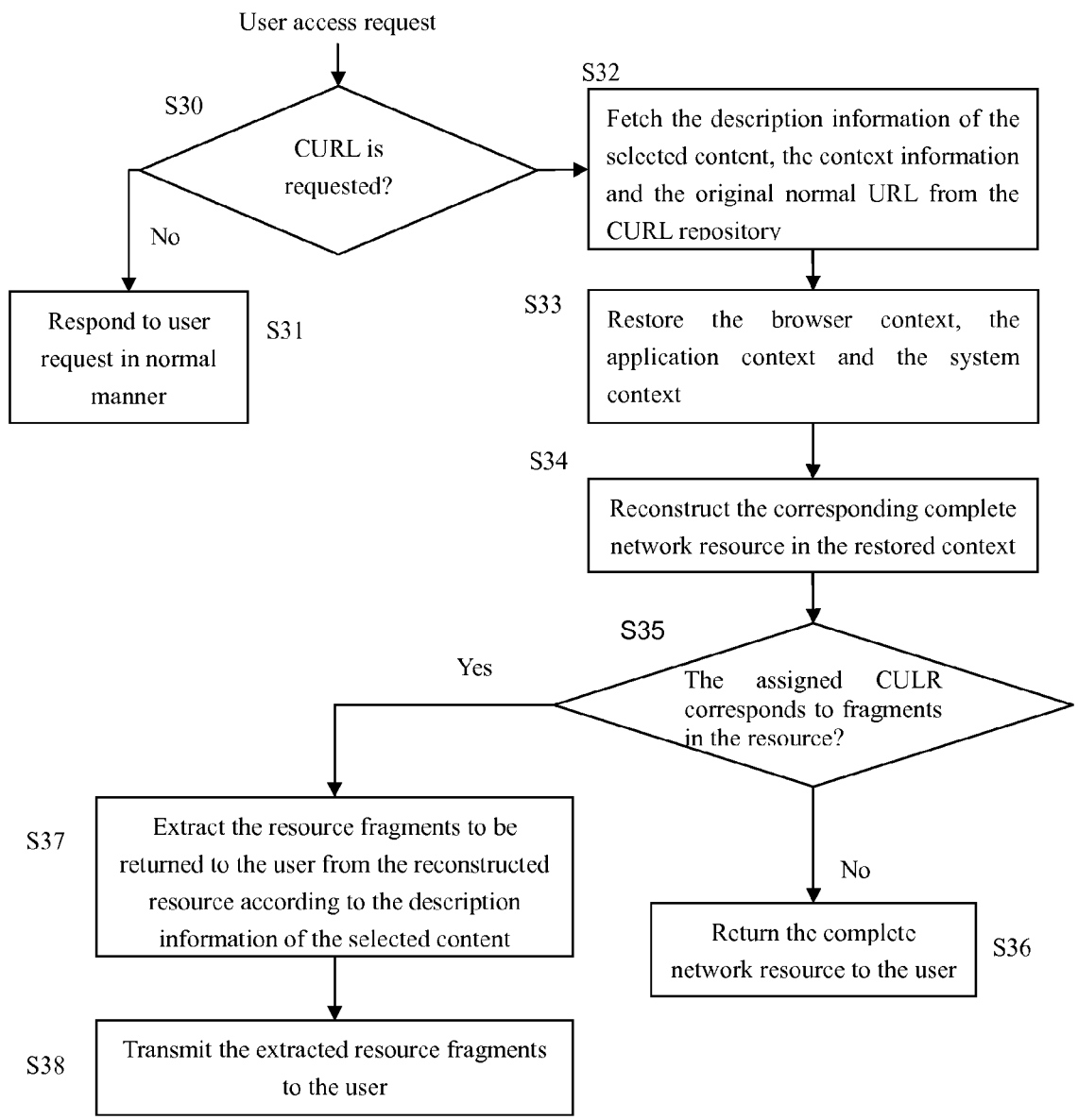
FIG. 3 shows a flowchart for accessing a network resource using a CURL according to one embodiment of the present invention.

According to one embodiment of the present invention, after the server generates the CURL applied by the user in response to user's request, the user and other users in the network can access the corresponding content in the server by entering the CURL in the browser. FIG. 3 shows a flowchart of providing user's desired network resource upon receiving a CURL access request of the user according to one embodiment of the invention. As shown in FIG. 3, when receiving the access address entered by a user in the client browser, the CURL filter in the server compares the access address with CURLs saved in the CURL repository, to determine whether a normal URL or a CURL is requested by the user currently, as shown in step S30. For the normal URL, the server processes the user's request in accordance with normal HTTP server processing flow, and returns the corresponding HTTP response message in step S31 (the detailed description is not discussed herein).

When the CURL filter determines that a CURL is requested by the user, it transmits the CURL to the access request processing means 230. The access request processing means obtains the original normal URL, context information, and the description information of the selected content corresponding to the CURL from the CURL repository and transmits the context information to the context restorer 240. The access request processing means transmits the original normal URL and the description information of the selected content to the content reproducer 250 in step S32. The context restorer 240 restores the browser context, the system context and the application context according to the received context information respectively in step S33. Then, the content reproducer 250 finds the server code corresponding to the received original normal URL and executes the server code in the restored specific context condition, thereby reconstructing the corresponding network resource in step S34.

In step S35, the content reproducer 250 further determines whether the content selected by the user is a complete network resource or a part of the network resource upon requesting for assigning CURL based on the received description information of the selected content. In other words, the content reproducer 250 determines whether the assigned CURL corresponds to a complete network resource such as a complete HTML page or one or more fragments of the resource, i.e., one or more page fragments. If it is determined that a complete network resource is selected, the result obtained in step S34 is transmitted to the client browser directly, as shown in step S36. If it is determined that fragments of the network resource are selected in step S35, the content reproducer 250 obtains the corresponding fragments from the complete network resource obtained in step S34 according to the description information of the selected content, such as the starting path and the ending path, in step S37, and transmits the fragments to the client browser in step S38.

Figure 4:
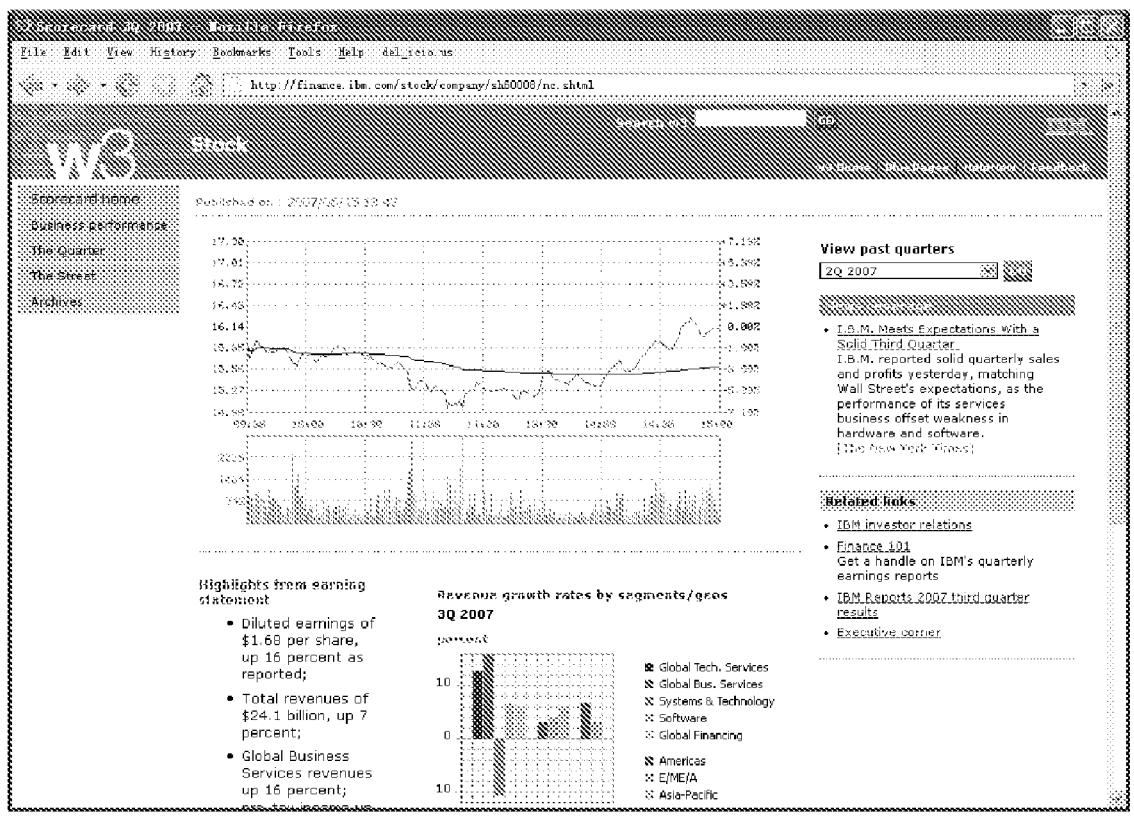
FIGS. 4-7 show several examples in which the various embodiments of the present invention can be applied, respectively.
Figure 4:

FIGS. 4-7 shows several typical examples applying the various embodiments of the present invention. The various embodiments of the present invention are further discussed in conjunction with these examples. Firstly, the example of binding dynamic resource to a CURL applying one or more embodiments of the present invention is discussed in conjunction with FIG. 4. The content and existing problem shown in FIG. 4 is explained above and will not be discussed herein. According to at least one embodiment of the present invention, if a user views stock graph through finance.ibm.com/stock/company/sh60008/nc.shtml at for example 13:42, Jun. 15, 2007, and wishes to view this graph again by accessing the server in the future, then the user may enter a CURL that he wishes to assign to the graph page using the plug-in in the client browser, such as finance.ibm.com/stock/company/sh60008/nc.shtml/20070615_1342, to request the server for assigning this CURL. The browser plug-in generates the description information of the selected content which instructs that the selected content is a complete HTML page, and transmits it with the requested CURL and the original normal URL finance.ibm.com/stock/company/sh60008/nc.shtml to the server, to request the server for assigning this CURL.

After receiving the request, the server determines whether the requested CURL has been used, i.e., repetitive with the existing CURL. When it is determined that this CURL has not been used, the server accepts this request, instructs the browser plug-in of the client and the context extractor in the server to extract the browser context (Cookie variables of the client in particular), the application context (Session information in the server in particular) and the system context (system time in particular), and saves them with the corresponding normal URL, the applied CURL and the description information of the selected content in the server repository as a whole.

Henceforth, when the user wishes to view the stock graph at 13:42, Jun. 15, 2007, the user may enter the generated CURL finance.ibm.com/stock/company/sh60008/nc.shtml/20070615_1342 in the browser directly to gain access to the stock graph. When this entered CURL is received from the client browser, the server compares the CURL with respective CURLs saved in the CURL repository, to determine that the user enters the CURL rather than a normal URL. In this case, the server obtains the context information corresponding to the CURL from the CURL repository and transmits it to the context restorer. The server obtains the description information of the selected content and the original normal URL and transmits them to the content reproducer.

The context restorer restores the browser context, the system context, and the application context respectively according to the received context information. The content reproducer runs server code corresponding to the original normal URL in the restored context, to reconstruct the HTML page as shown in FIG. 4. Then, the content reproducer determines what the user requests is the complete HTML page based on the description information of the selected content. The content reproducer transmits the reconstructed HTML page to the client browser accordingly. Thus, the user may view the stock graph as shown in FIG. 4 in the browser. Furthermore, not only the user who sets the CURL but also any other network users may view the stock graph at 13:42, Jun. 15, 2007 by entering the above CURL in the browser.

Figure 5:
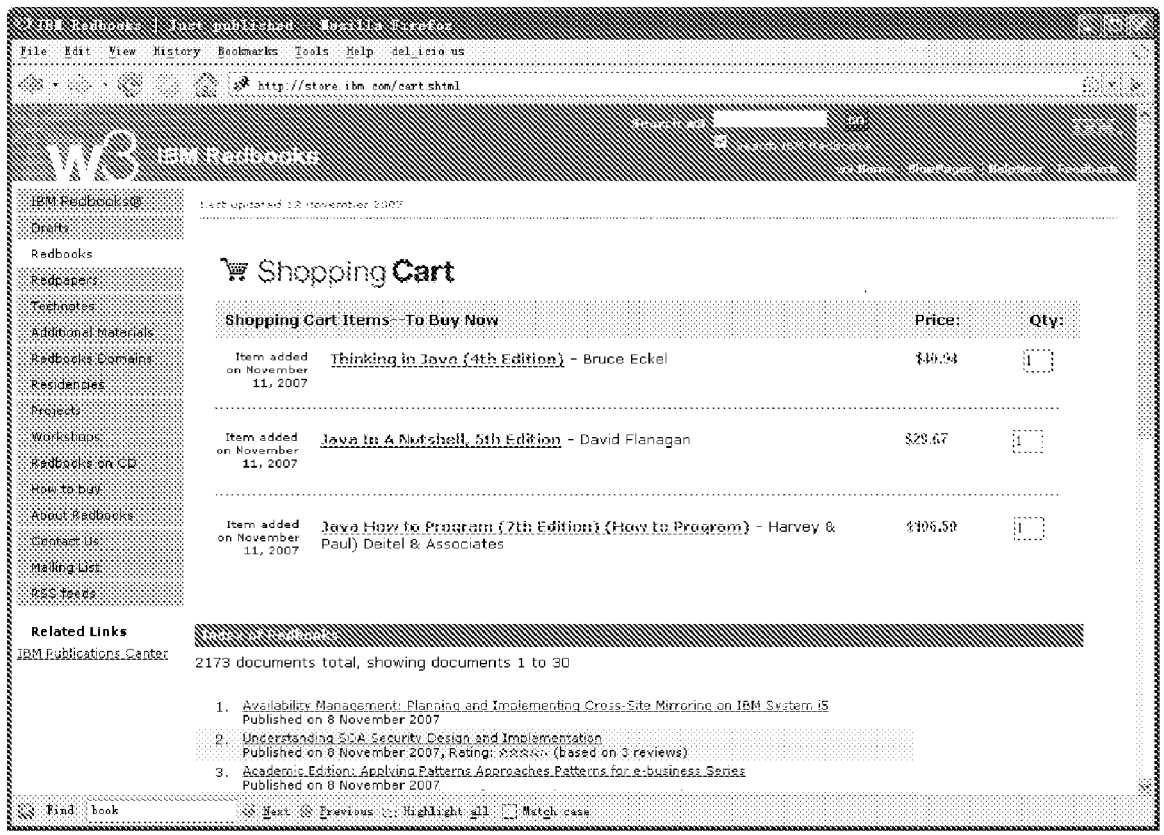
Figure 5:

Hereinafter, an example of assigning a CURL to the resource related to the user applying the method of the various embodiments of the present invention is discussed in conjunction with FIG. 5. In particular, FIG. 5 shows a page of the process of online book purchase. One can assume a situation in which user A is a student, and he/she orders some books online. Since user A does not have online payment ability, he/she does not finish this purchase process, but ends his purchase operation when proceeding to the purchase page, the path of which is store.ibm.com/cart.shtml, and quits the browser. Then, user A may ask his/her parent user B for paying his selected books. In this situation, when user A performs the purchase operation, a Session related to the user A is formed in the server. The Session is identified uniquely by the browser used by the user currently, while the related Session becomes invalid when user A quits the browser. Therefore, when user B runs the browser again and enters the above URL, the accessed page is not the payment page as shown in FIG. 5. That is, user B cannot browse the payment page directly and perform the payment, but needs to perform the above operation of logging on the website, browsing the books and selecting books etc again to reach the payment page, which is obviously time-consuming and inconvenient.

By applying one or more of the various embodiments, user A may enter the CURL that he/she wishes to assign to the payment page using the browser plug-in, such as store.ibm.com/cart.shtml/gary_java, and request the server for generating and assigning this CURL. When the server determines that the CURL is acceptable according to the set determination rule, the applied CURL, the original normal URL store.ibm.com/cart.shtml, the browser context, the application context (Session information), and the system context are saved in the server repository. Since the Session information related to the HTML page as shown in FIG. 5 is saved, when user B enters the above CURL in the browser in the future, the server may restore the corresponding context information, and execute the corresponding server code in the restored context condition, thereby reconstructing the payment page as shown in FIG. 5. Thus, user B may perform subsequent payment operations in the payment page as shown in FIG. 5.

Figure 6:
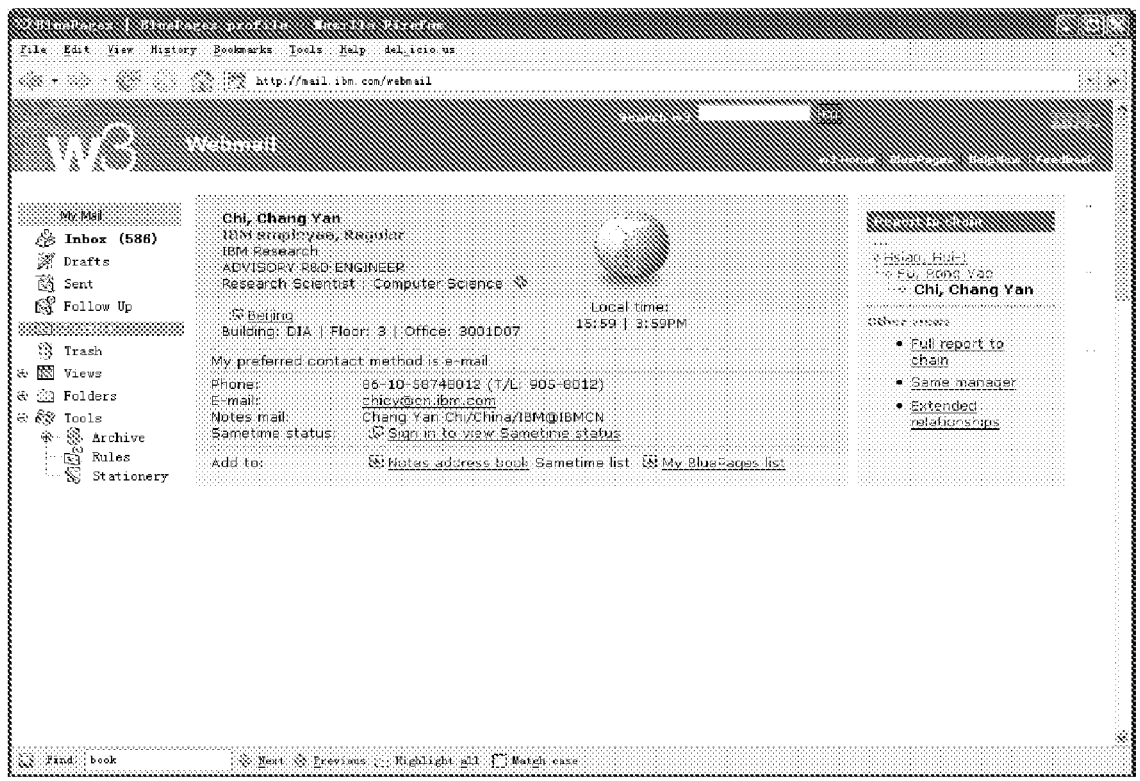
Figure 6:

Hereinafter, an example of assigning a CURL to resource related to authority applying the method of the present invention is discussed in conjunction with FIG. 6. An electronic mailbox is the private resource of users, and it is generally undesirable that unauthorized person accesses the mailbox of users without permission. Hence, if someone wishes to log on the electronic mailbox, he/she needs to pass the identification process. One can assume a situation in which user A possesses an electronic mailbox in a certain website, such as mail.ibm.com/webmail, and the contact information of user B, C, D, and E etc., is saved in the address book of the electronic mailbox. Then, user B notifies user A that his/her contact information changes. In general case, user B is not authorized to enter into user A's mailbox. Therefore user B cannot modify the contact information in the address book of the mailbox. The modification can only be made by user A entering into his/her own mailbox. If user B is authorized to have access to user A's mailbox, user B can not only access the page having his contact information displayed as shown in FIG. 6 and modify his contact information, but also access other pages in the mailbox to browse user A's letter and perform any operations that user A is authorized to perform. Both of the situations are not satisfying. Hence, user A may wish that user B is only authorized to access and modify the page displaying his/her contact information, and is not authorized to perform access and operation to other pages.

By applying one or more embodiments discussed above, for the page displaying the contact information of user B (chicy) as shown in FIG. 6, user A may enter a CURL that he/she wishes the server to assign through the browser plug-in, such as mail.ibm.com/webmail/xiaowp@cn.ibm.com/contacts/chicy. User A can then request the server for generating and assigning this CURL. Also, the page as shown in FIG. 6 is further set as readable and writable for enabling user B to modify the contact information. After receiving the assigning request, the server determines whether the CURL is acceptable. In particular, the server determines whether the request is made by user A with reading and writing authority to the page as shown in FIG. 6 in the first place. The server then further determines whether the CURL has been used. In this example, when it is determined that the CURL is acceptable, the server saves the CURL with the original normal URL mail.ibm.com/webmail, the browser context, the application context and the system context into the server repository. Thus, when user B enters the above CURL in the browser, the contact information page as shown in FIG. 6 can be displayed, and information in the page can be modified. Meanwhile, since user B is not authorized to access other HTML pages, he/she cannot access and operate other applications in the mailbox of user A.

Figure 7:
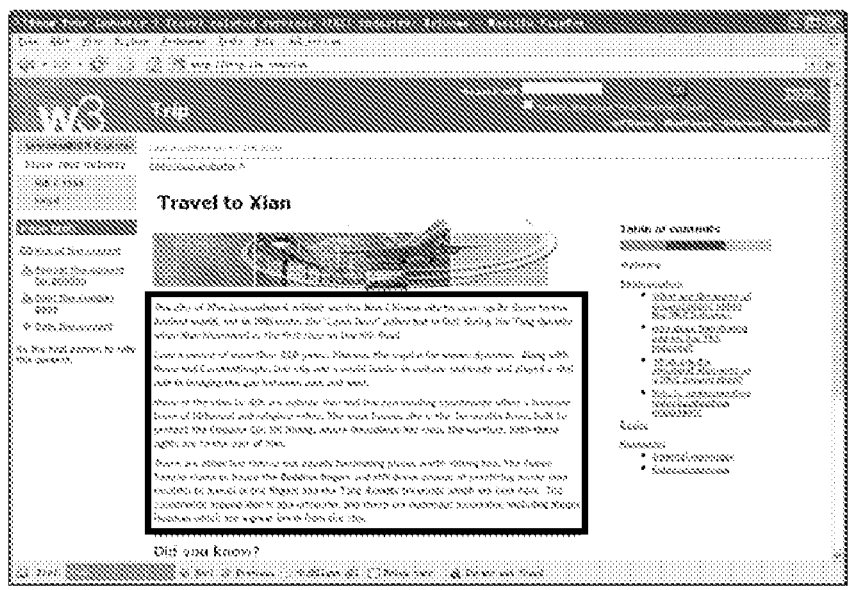
Figure 7:

The example of assigning a CURL for fragments in the network resource by applying one or more embodiments of the present invention is discussed in conjunction with FIG. 7 hereinafter. With the appearance and development of Web 2.0, the need for simply integrating parts of the functions of different web applications together is more and more proposed. One can assume a situation in which user A is developing a tour website, and he wishes to mash up a fragment of text content introducing Xian on the website page to which a URL address trip.ibm.com/xian is directed and a fragment of video content provided on the website page to which another URL address video.ibm.com/xia is directed into his tour website, as shown in FIG. 7. However, both of the two websites above do not provide Mash-up and RESTful API. Therefore, user A cannot extract his/her interested text fragments and video fragment and mash them up into the website being developed easily.

By applying one or more embodiments of the present invention, user A can box-select his/her interested content by using the plug-in in the browser, such as the content selected with thick-line-box in the upper figure of FIG. 7, and apply a CURL for the box-selected content, such as trip.ibm.com/xian/intro. The browser plug-in generates the description information of the selected content, which instructs that the selected content is a fragment in the HTML document and marks the area selected by the user through the starting path and the ending path. Then, the browser plug-in transmits the description information of the selected content with the applied CURL, the original normal URL trip.ibm.com/xian to the server, to request the server for assigning this CURL. When it is determined that the CURL is acceptable according to the set determination principle, the server instructs the browser plug-in of the client and the context extractor in the server to extract the browser context, the application context and the system context respectively. The server then saves the obtained context information with the corresponding normal URL, the applied CURL and the description information of the selected content into the server repository as a whole.

Then, when user A wishes to obtain the box-selected HTML document fragments, he/she may access them by entering in the browser directly the assigned CURL trip.ibm.com/xian/intro. When it is determined that CURL is received from the client browser, the server obtains the context information corresponding to the CURL from the CURL repository and transmits it to the context restorer. The server obtains the description information of the selected content and the original URL and transmits them to the content reproducer. Then, the context restorer and content reproducer execute the method according to the invention, thereby reconstructing a complete HTML page as shown in the upper part of FIG. 7. At this time, according to the description information of the selected content, the content reproducer determines what is requested by the user is a part of the complete HTML page, i.e., the content selected by the user upon requesting for assigning the CURL is fragments in the complete HTML page.

Therefore, the content reproducer obtains the fragment content box-selected by the user from the reconstructed complete HTML page according to the starting path and the ending path in the description information of the selected content, and transmits the fragment content rather than the complete HTML document to the client browser. Further, user A may integrate the obtained content fragment into his/her own tour website by using Mash up. Similarly, user A may also box-select a fragment in the video resource as shown in the lower part of FIG. 7 using the invention, and request the server for assigning a CURL such as video.ibm.com/xian/1:30-2:30 to the video fragment, so that the selected separated video fragment rather than the complete video can be accessed through the CURL as needed in the future, and can be integrated into his/her own tour website using Mash up.

software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Although some exemplary embodiments of the present invention is showed and discussed, those skilled in the art should understand that variations can be made to these exemplary embodiments without departing from the principle and spirit of the present invention defined in the claims and their equivalents.

What is claimed is:

1. An apparatus for generating a Customized Uniform Resource Locator (CURL), the apparatus comprising:
    a processor;
    a request receiver configured to receive a request for assigning a CURL applied by a user to selected dynamic content in a network resource accessed through an original normal URL, the CURL being a uniform resource locator that is defined by the user, a previous state of the dynamic content previously made available by the original normal URL being accessible through the CURL, and the previous state being no longer available via the original normal URL;
    an information obtainer configured to obtain the normal URL, the CURL, and a set of description information of the selected dynamic content; and
    a CURL register configured to obtain a browser context, an application context, and a system context related to the selected dynamic content, the CURL register being configured to store the browser context, the application context, and the system context which have been obtained with the normal URL, the CURL, and the set of description information of the selected dynamic content into a CURL repository as a whole.

2. The apparatus of claim 1, wherein the selected dynamic content is a part of one of the network resource accessed through the normal URL and the network resource itself.

3. The apparatus of claim 2,
    wherein the information obtainer determines whether the CURL is acceptable after obtaining the CURL, and informs a determination result to the CURL register, and
    when the CURL is acceptable, the CURL register obtains the browser context via a client browser plug-in and obtains the system context and the application context via a context extractor in response to the determination result.

4. The apparatus of claim 3, wherein the CURL register displays to the client browser a set of context information that has been obtained after obtaining the browser context, the system context and the application context, and saves only context information that a user selects and wishes to save, a corresponding normal URL, the CURL, and the description information of the selected dynamic content into the CURL repository.

5. The apparatus of claim 1, wherein the browser context refers to values of corresponding variables saved in at least one Cookie and a set of JavaScript by a website when the user accesses the network resource through the original normal URL, the application context refers to Session information formed in a server when the user accesses the network resource through the original normal URL, and the system context refers to system environment condition values when an operating system runs.

6. An apparatus for providing a network resource corresponding to a Customized Uniform Resource Locator (CURL) in response to an access request from a user, the apparatus comprising:
    a processor configured to:
        receive a CURL access address from a user, the CURL access address being a uniform resource locator that is user definable and that is associated with a given set of content in a network resource accessed through an original normal URL, a previous state of the given set of content previously made available by the original normal URL being accessible through the CURL access address, and the previous state being no longer available via the original normal URL;
        fetch a set of contexts, a set of description information of the given set of content, and the original normal URL corresponding to the CURL access address from a CURL repository; and
        transmit the set of contexts, the set of description information, and the original normal URL to a context restorer and a content reproducer;
    a context restorer configured to:
        restore a browser context, an application context, and a system context specific condition according to the set of contexts received from the access request processor; and
        transmit the browser context, the application context, and the system context specific condition to the content reproducer; and
    a content reproducer configured to:
        reconstruct the given set of content in the network resource associated with the CURL access address, the given set of content being reconstructed in the browser context, the application context, and the system context, which have been restored according to the original normal URL and the description information of the given set of content received from the access request processor; and
        transmit the given set of content in the network resource that has been reconstructed to a client browser.

7. The apparatus of claim 6, further comprising a CURL filter configured to receive the CURL access address through the client browser from the user, compare the CURL access address with CURLs saved in the CURL repository to determine whether the CURL access address is a CURL access address, and when it is, the CURL filter being further adapted to accept the CURL access address entered by the user and transmit the CURL address to the access request processor.

8. The apparatus of claim 7, wherein the content reproducer comprises:
    a complete resource reproducer configured to completely reconstruct the given set of content in the network resource corresponding to the CURL access address entered by the user in the specific context condition that has been restored according to the original normal URL received from the access request processor; and a request resource provider configured to determine whether the given set of content selected by the user when requesting for assigning the CURL is a complete resource or fragment(s) of the resource according to the description information of the given set of content received from the access request processor, wherein when a complete network resource is selected and reconstructed, the reconstructed complete network resource is transmitted to the client, and when the fragments of the network resource are selected, corresponding fragments are extracted from the reconstructed complete network resource according to the description information of the selected content, and transmitted to the client.

9. The apparatus of claim 6, wherein the browser context comprises values of corresponding variables saved in at least one Cookie and a set of JavaScript by a website when the user accesses the network resource through the original normal URL, the application context comprises Session information formed in a server when the user accesses the network resource through the original normal URL, and the system context comprises system environment condition values when an operating system runs.

10. A method for generating a Customized Uniform Resource Locator (CURL), the method comprising the steps of:
receiving a request for assigning a CURL applied by a user to selected dynamic content in a network resource accessed through an original normal URL, the CURL being a uniform resource locator that is defined by the user, a previous state of the dynamic content previously made available by the original normal URL being accessible through the CURL, and the previous state being no longer available via the original normal URL;
obtaining the normal URL, the applied CURL, and a set of description information of the selected dynamic content;
obtaining a browser context, an application context, and a system context related to the selected dynamic content; and
storing the browser context, the application context, and the system context that have been obtained with the normal URL, the applied CURL, and the description information of the selected dynamic content into a CURL repository as a whole.

11. The method of claim 10, wherein the receiving step comprises providing a client browser of the user with a browser plug-in such that the user can select a desired dynamic content in the network resource accessed through the normal URL using the plug-in.

12. The method of claim 11, wherein the selected dynamic content is a part of one of the network resource accessed through the normal URL and the network resource itself.

13. The method of claim 10, wherein the browser context refers to values of corresponding variables saved in at least one Cookie and a set of JavaScript by a website when the user accesses the network resource through the original normal URL, the application context refers to Session information formed in a server when the user accesses the network resource through the original normal URL, and the system context refers to system environment condition values when an operating system runs.

14. The method of claim 10, wherein the step of obtaining the browser context, the application context, and the system context related to the selected content comprises obtaining all of the browser context, the system context, and the application context related to the selected dynamic content in the network resource.

15. The method of claim 10,
wherein the step of obtaining the browser context, the application context, and the system context comprises saving the browser context, the application context, and the system context that have been obtained into the CURL repository, and
the browser context, the system context, and the application context are obtained based on a configuration file, in which a set of context information associated with the browser context, the application context, and the system context that is to be obtained upon requesting for assigning the CURL is specified.

16. The method of claim 10, wherein the step of obtaining the browser context, the application context, and the system context comprises:
saving the browser context, the application context, and the system context that have been obtained into the CURL repository;
displaying to the client browser context information associated with the browser context, the application context, and the system context that have been obtained, and prompting the user to select context information that the user wishes to save; and
saving the selected context information with the original normal URL, the applied CURL, and the description information of the selected content into the CURL repository in response to the user's selection of the context information.

17. A method for providing a network resource corresponding to a Customized Uniform Resource Locator (CURL) in response to an access request from a user, the method comprising the steps of:
accepting a CURL access address from the user, the CURL access address being a uniform resource locator that is user definable and that is associated with a given set of content in a network resource accessed through an original normal URL, a previous state of the given set of content previously made available by the original normal URL being accessible through the CURL access address, and the previous state being no longer available via the original normal URL;
fetching a set of context, a set of description information of the given set of content, and the original normal URL corresponding to the CURL access address from a CURL repository;
restoring a browser context, an application context, and a system context using the the set of contexts that have been fetched creating a restored context condition;
reconstructing the given set of content in the network resource in the restored context condition; and
transmitting the given set of content in the network resource that has been restored to a client browser.

18. The method of claim 17, wherein the accepting step comprises:
receiving the CURL access address through the client browser from the user;
comparing the received CURL access address with CURLs saved in the CURL repository to determine whether the received CURL access address is a CURL access address; and
when the received CURL access address is a CURL access address saved in the CURL repository, the CURL access address entered by the user is accepted.

19. The method of claim 17, wherein the reconstructing step comprises:
reconstructing a complete version of the given set of content in the network resource in the restored context condition;
determining whether the given set of content selected by the user when requesting for assigning CURL is one of a complete resource and one or more fragments of the resource according to the description information of the selected content;
when the complete network resource is selected, the reconstructed complete network resource is transmitted to the client; and
when the fragments of the network resource are selected, corresponding fragments are extracted from the complete network resource according to the description information of the selected content, and transmitted to the client browser.

* * * * *